May 5, 1942. N. RIPPEN Re. 22,091

SHEATHING SYSTEM

Original Filed April 21, 1932 2 Sheets-Sheet 1

Inventor:
Nicholas Rippen

May 5, 1942. N. RIPPEN Re. 22,091

SHEATHING SYSTEM

Original Filed April 21, 1932 2 Sheets-Sheet 2

Inventor:
Nicholas Rippen

Reissued May 5, 1942

Re. 22,091

UNITED STATES PATENT OFFICE 22,091

SHEATHING SYSTEM

Nicholas Rippen, Los Angeles, Calif.

Original No. 2,238,289, dated April 15, 1941, Serial No. 606,620, April 21, 1932. Application for reissue June 11, 1941, Serial No. 397,630

13 Claims. (Cl. 114—84)

My invention relates but is not limited to the class of sheathing systems wherein the sheathed member is welded to but is not perforated to accommodate any part of the fastening means, which does not present itself on or extend to the exterior surface of the sheathing, and relates particularly to the system described in my U. S. A. Patent application filed December 15, 1931, bearing Serial Number 581,137 and entitled "Wooden sheathing" and patented July 8, 1941, No. 2,248,690.

In my wooden sheathing invention, if thin welding-walls are used or if the sheathing is constituted of soft lumber, those sheathing-portions which adjoin the fastening means, under certain conditions, will be charred by the welding-heat, thus partially or entirely defeating their function as retaining mediums between the sheathing and the sheathed member. To eliminate the greater part, and usually all of this charring effect, I design and dispose the various parts so that the greater part of the welding-heat is dissipated before reaching said sheathing portions; at least most of the welded part or parts of the fastening means, also termed general means, is appreciably spaced from said sheathing-portions at least during the greater part of the welding operations in various ways which will be set forth below as well as in the accompanying drawings illustrating fastening means embodying my invention in which—

Cross-sectional view of welding are indicated by horizontal shading. The words "axis" and "axial" refer to that axis of the general means in all of the views which is disposed rectangularly to the plane of the sheathed surface of the sheathed member.

Figure 2:
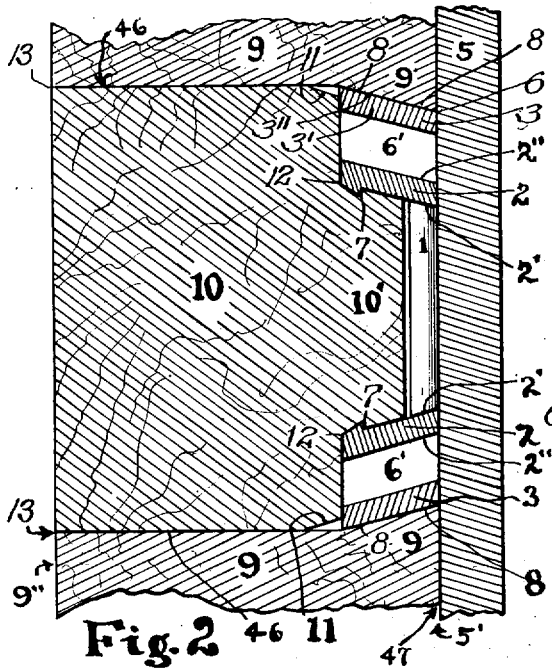
Figure 2 illustrates the above general means, taken cross-sectionally in the plane of B—B in Figure 1, the plug and part of the sheathing being included.
Figure 1:
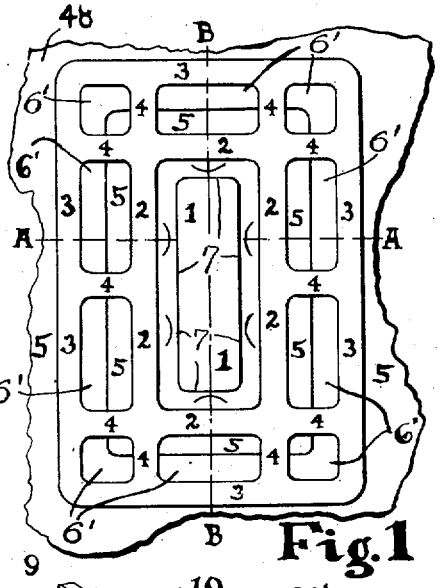
Figure 1 illustrates, in plan view, a "rectangular" form of my general means, wherein there are, on the same side of the axis of the general means, two walls spaced from one another, both the sheathing and the plug being omitted from the view.
Figure 3:
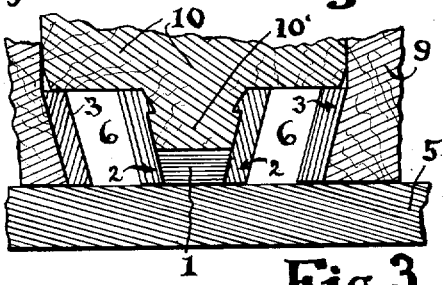
Figure 3 illustrates the above general means, taken cross-sectionally in the plane of A—A in Figure 1, part of the plug and sheathing being included.

Referring to Figures 1, 2 and 3, the numeral 5 indicates a metal plate or member, also termed "sheathed member," whose sheathed surface is indicated by 5'. The numeral 9 indicates the sheathing on the sheathed member, the sheathing being of wood in most instances. Its sheathing surface is indicated by 47 and its exterial surface by 9''. Numeral 13 indicates, in the sheathing, a through major opening, whose defining surfaces 46 and 8, extend from said exterior surface to said sheathed surface, the major opening thus opening to, communicating with or being bound by said exterior surface and said sheathing surface, which is equivalent to saying that the major opening opens to the exterior surface and the sheathed member, more specifically to 5', the sheathed surface of said sheathed member. Numeral 10 indicates a plug and 10' its extension, said plug being either of wood or composition, or it may be an originally fluid material deposited in the major opening and permitted to harden in situ. The fastening means, or general means, securing the sheathing on the sheathed member is indicated by 48, and is disposed within the major opening, substantially adjoining the sheathed member. Although it is preferably an integral structure, as for example an annealed steel casting, or formed into an integral structure from originally distinct parts welded together, I prefer, for the sake of simple exposition in both the specification and claims, to regard it as constituted of two principal parts spaced from but rigidly joined to one another thru the medium of intervening webs, one of said parts being hereinafter referred to as the "welding part," indicated by 2—2—2—2, and the other by the "spaced outer part," indicated by 3—3—3—3, their respective walls being termed "welding walls," indicated by 2, and "spaced outer walls," indicated by 3, and the said webs being indicated by 4 and defining, together with the welding-walls and the spaced outer walls, spaces 6'. Each welding-wall has two substantially opposed, mutually non-intersecting surfaces, angularly disposed toward and substantially terminating in the plane of the sheathed surface, one of said two surfaces being referred to as the "welding-surface," indicated by 2', and the other as the "opposed surface" indicated by 2''. Since the welding-walls are naturally contiguous with the welding-opening 12 in the welding-part, (obviously the welding-part may be provided, instead of the single through welding-opening 12, with a plurality of such welding-openings without departing from the spirit of my invention), welding-opening 12 may be regarded as being defined by said welding-surfaces. Each spaced outer wall 3 has two substantially opposed surfaces, angularly disposed toward the plane of said sheathed surface, of which two surfaces the one that confronts said opposed surface is hereinafter referred to as the "inner surface" and is indicated by 3' and the other is hereinafter referred to as the "outer surface" and is indicated by 3''. The welding-part is welded to the sheathed member by weld 1, for which it is noted a part of each of said welding-surfaces serves, said weld being of the plug-weld type, although, if the general means be somewhat larger, it may be of the more desired fillet-weld type. It will be noted that the welding-part is spaced from the sheathing, which is equivalent to saying that the opposed surface is spaced from the defining surfaces 46 and 8, and more specifically from defining surface 8, the spaces being indicated by 6. The outer surfaces approach one another in the direction toward the sheathed member, so that the general means may be described as having the form of a truncated pyramid with a rectangular base. Although the general means is obviously appreciably smaller than the major opening, a more specific description would be that the maximum dimension of the sheathing in the direction rectangular to the plane of the sheathed surface appreciably exceeds the maximum dimension of the general means in the like direction. The numeral 9' indicates the sheathing-portions substantially adjoining the general means along or at defining surface 8, which in turn is disposed substantially in the plane of the outer surface. Numeral 11 indicates the bevelled or chamfered edges of the plug, designed to permit easy, quick entrance into the major opening on the part of the plug. The welding-walls are provided on their said welding-surfaces with a plurality of sharp-edged projections 7, designed to seize the extension 10' of the plug when it is being forcibly driven into the major opening with a few blows of the maul. Of course, if the plug should be deposited in the fluid state, the projections 7 would function in practically the same way. To describe the procedure when dealing with fastening means such as illustrated in Figures 1, 2 and 3, the first step is to cut the major openings, after which, if the sheathing takes the form of deck-planking, the planks are deposited on the deck in the desired final positions and the fastening means are dropped into the major openings. The weight of the welding-operator suffices to press the planks with their corresponding fastening means into sufficiently close contact with the steel deck for efficiently welding the former to the latter in the parts already mentioned. When employing my system for the fenders of the sides or ends of a barge or for other vertical or overhead positions, the fastening means should be deposited in the major openings and temporarily retained with light brads or other suitable devices before attaching the sheathing to the sheathed members, any of many methods familiar to experienced personnel being utilized to firmly press the sheathing against the sheathed members while the fastening means are being welded thereto. On account of the spaces 6' and the outer parts 3, the greater part of the welding-heat is dissipated to the atmosphere and to the sheathed member instead of reaching the adjoining portions of the sheathing. After the welding has been completed, the plug is driven into the major opening, the plug-extension simultaneously entering the welding-opening practically to the limit, the dimensions of the plug-extension being designed solely with regard to inevitable irregularities in the thickness of the weld 1. The various parts are previously coated, preferably, with red lead or other substance having binding and sealing qualities, in order to supplement the function of the sharp-edged projections in retaining the plug in addition to serving as a barrier against moisture entering. Subsequently to the welding-operation but previously to the inserting of the plug, it may be desired to fill the spaces 6' with wood or other solid substances or with cement, to aid the webs 12 in their task of preventing the outer walls from collapsing inwardly under pressure of the sheathing when tending to lift from the sheathed members. As a matter of fact, it might be considered expedient, in many instances, to make the inclusion of such filler-pieces mandatory in order to take advantage of the relatively non-heat-conductive qualities of extra thin webs. A fastening means comprising walls spaced from one another on the same side of the axis, as above described, may also be "circular" in form, it will be understood. The "rectangular" form is peculiarly suited to applications wherein a single fastening means is desired to secure the adjoining ends or sides of adjoining planks of sheathing, in which case, the fastening means would be disposed with its plane B—B substantially rectangular to the plane of the welded juncture in its length.

Figure 5:
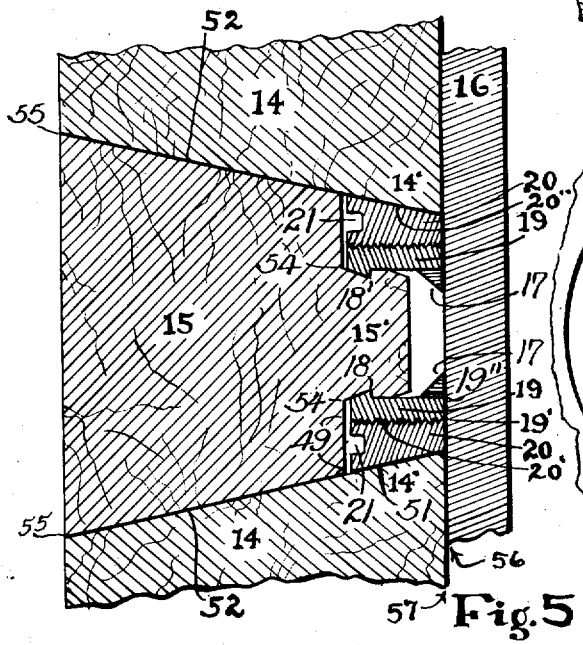
Figure 5 illustrates the general means of Fig. 4, taken cross-sectionally in an axial plane, the plug and part of the sheathing being included in the view.
Figure 4:
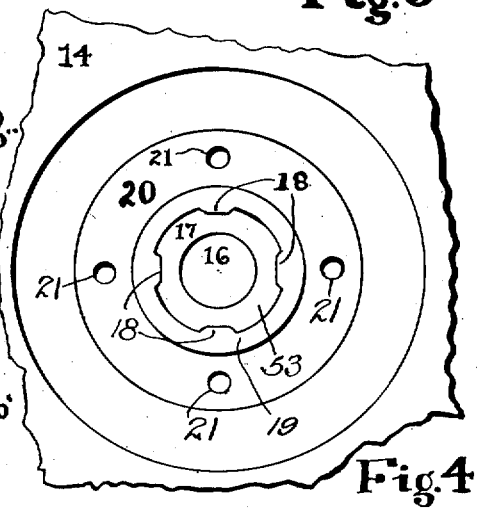
Figure 4 illustrates, in plan view, a "circular" form of my general means, wherein there are, on the same side of the axis of the general means, two walls adjoining one another, the plug being omitted from the view.

In Figures 4 and 5, we have an example of my invention wherein the outer part is an "adjoining outer part" instead of a spaced outer part. To be specific, 20 indicates the adjoining outer part, adjoining welding-part 19, whose welding-surface is indicated by 19'' and its opposed surface by 19'. Numeral 16 indicates the sheathed member and 14, the sheathing. The general means is indicated by 53, the adjoining sheathing-portions by 14', the plug by 15, the plug-extension by 15' and the weld by 17. It will be noted that, contrasted with the plug-weld type of weld in the fastening means illustrated in the first three figures, Figures 4 and 5 show a fillet-type of weld. The inner surface of the adjoining outer part is indicated by 20' and its outer surface by 20''. The major opening in the sheathing, 55, is defined by defining surfaces 51 and 52, defining surface 51 being the particular one corresponding to adjoining sheathing-portions 14'. The space between the opposed surface and the defining surfaces (or the sheathing) is indicated by 49. The general means is provided with a through welding-opening 54 substantially opening to the sheathed member. The numeral 18 indicates the sharp-edged projections that the welding-part is provided with on its said welding surfaces. The inner surface and the opposed surface are provided with mutually cooperating threads so that, after the welding-part has been welded to the sheathed member, the adjoining outer part is screwed into place thru the medium of a tool cooperating with holes 21 in said adjoining outer part, its outer surface forming an obtuse angle with the plane of the sheathed surface 56 of the sheathed member, when regarded from the axis of the general means. The outer surface is substantially parallel with the defining surface 51 so that, when the adjoining outer part is screwed in, it wedges the adjoining sheathing-portions against the sheathed member. The sheathing surface of the sheathing is indicated by 57. The edge of the plug-extension 15' is bevelled to facilitate its entrance into the welding-opening. The defining surfaces 52 approach one another in the direction toward the sheathed member, thereby wedging the bulk as well as the adjoining portions of the sheathing against the sheathed member. In other words, the plug may be regarded as having the form of a truncated cone whose projected apex is directed in the direction of the sheathed member, regarded from the sheathing. The welding-part is inserted and held in place either by the adjoining outer part being temporarily screwed on it or by a special spacing device of obvious construction. The welding-part is then tack-welded to the sheathed member, after which the adjoining outer part or the special spacing device, whichever it is, is removed while the finish-welding is completed and then the adjoining outer part is screwed into place. If desired, the sheathing, after having served as a template is positioning the general means on the sheathed member, may be removed while the finish-welding is being executed, in which case the only charring would be the inconsequential amount created by the tack-welding.

Figure 6:
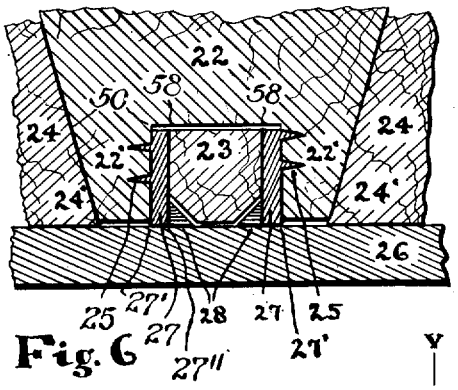
Figure 6 illustrates a "circular" form of my general means, taken cross-sectionally in an axial plane, wherein there is, on the same side of the axis of the general means, a single wall disposed with a space between it and the sheathing, the space being filled with an extension of the plug.

The view of the fastening means in Figure 6 is taken cross-sectionally in a plane similar to that in Figure 5, the sheathed member being indicated by 26, the sheathing by 24, the adjoining sheathing-portions by 24', the welding-part by 27, its welding-surface by 27'' and its opposed surface by 27'. Said opposed surface is provided with a thread 25, the space between the opposed surface and the sheathing being indicated by 50. 22 indicates the plug and 22', its extension. The numeral 58 indicates the welding-opening, which, in this particular fastening means, is not penetrated by the plug-extension; the latter serves to fill the space 50 instead, the plug of course being screwed in instead of being hammered in with a maul, the plug-extension being internally threaded to cooperate with thread 25. If the plug be constituted of soft or medium hard wood, the internal thread may be permitted to be cut by the thread 25 when the plug is being screwed in. If of hard wood, the internal thread will have to be previously cut. This particular fastening means therefore presents one which may be described as "the general means comprises the welding-part 27 and the plug-extension 22', both serving together to retain the sheathing on the sheathed member," to which the welding part is welded by weld 28. To prevent the welding-part from collapsing inwardly, the welding-opening, subsequently to the welding-operation but previously to the inserting of the plug, is filled with a piece of wood or other suitable material. To place the welding-part in the desired position relatively to the sheathed member, the former is temporarily fixed in the major opening of the sheathing with their sheathing surfaces substantially in a common plane, by means of a simple device threading on thread 25 and bearing on the defining surfaces of the major opening, particularly at the adjoining sheathing portions. The welding-part is then tack-welded, the fixing device is removed and the weld 28 is completed, the temporary removal of the plank during the finish-welding being an optional matter. When the plank is again in place and the plug has been inserted, the plug-extension functions exactly like adjoining outer part 20 in Figure 5 in wedging the adjoining sheathing-portions against the sheathed member. The plug may be tapered for its entire axis or it may be tapered solely at the adjoining sheathing-portions, just as is the case in the example illustrated in Figures 4 and 5. It is of course understood that the example in Figure 6 is of the "circular" form and is not adapted to the "rectangular" or other form.

Figure 7:
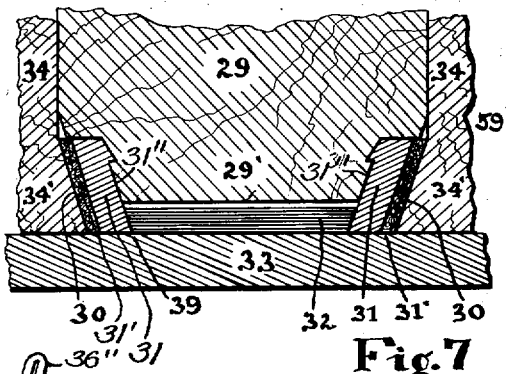
Figure 7 illustrates a "rectangular" form of my general means, taken cross-sectionally in a plane similar to that in Figure 2, wherein there is, on the same side of the axis of the general means, a single wall disposed with a space between it and the sheathing, the space being filled with heat-insulating material.

Figure 7 is a view of a "rectangular" form of my fastening means taken cross-sectionally in a plane similar to that in Figure 2, the sheathed member being indicated by 33, the sheathing by 34, the adjoining sheathing-portions by 34', the welding-part by 31, its welding-surface by 39, its opposed surface by 31', the sharp-edged projections on the welding-surface by 31'', the weld by 32, the plug by 29 and the plug-extension by 29'. The numeral 59 indicates the space between the opposed surface and the sheathing, filled with asbestos or other heat-resistant material 30. The asbestos is introduced simultaneously with the welding part or stuffed into the space after the welding-part has been inserted in the major opening, all depending on whether the sheathing is being applied overhead, to the sides or bottom of a structure or its top. This type of general means is adapted to installations wherein the sheathing is of extra hard and therefore not readily charred lumber. The plug-weld type is shown here, although the "rectangular" form may of course be made slightly wider than assumed in Figures 1 and 3 similarly to that in Figure 7, in which case the fillet type of weld may be used. If desired, this fastening means may also be adapted to the "circular" form. After the welding-operation has been completed, the asbestos may either be permitted to remain in place or it may be extracted and supplanted by some harder material deposited in either solid or fluid state, a cement with good binding qualities for example.

Figure 8:
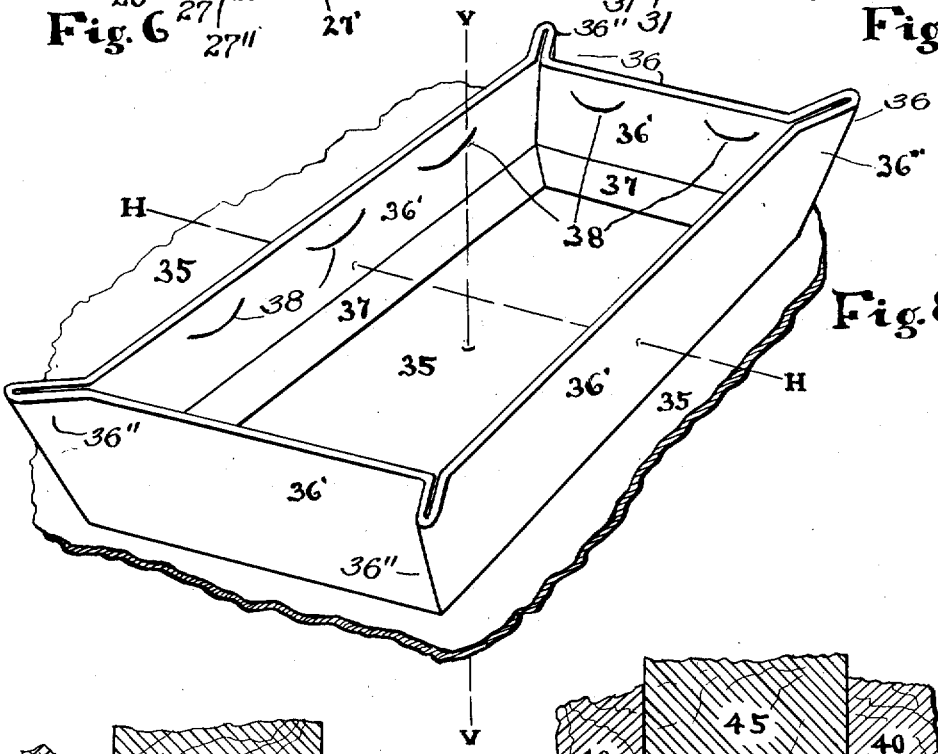
Figure 8 illustrates, in perspective view but omitting the sheathing, the plug and certain adjoining outer parts to be described, a "rectangular," distensible form of my general means, the angular relation of whose walls to the sheathed member can be altered.
Figure 9:
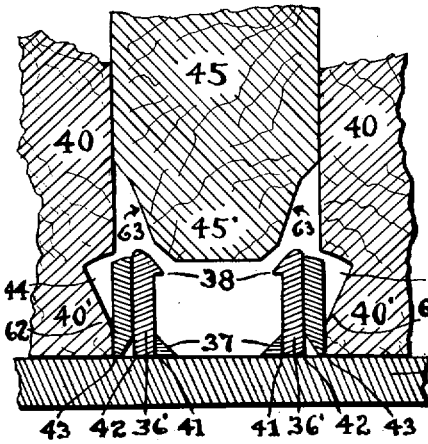
Figure 9 illustrates the above general means, taken cross-sectionally in the plane H—H, V—V, in Figure 8, before said general means have been distended by altering the angular relation of its walls to the sheathed member, certain adjoining outer parts to be described and parts of the plug and sheathing being included in the view.
Figure 10:
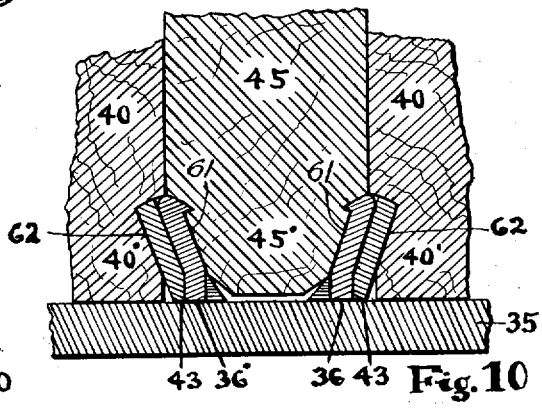
Figure 10 is a view similar to that of Figure 9, but showing the positions of the parts after the plug has been inserted.

The views in Figures 8, 9 and 10 illustrate my fastening means in a "rectangular" form but comprising a welding-part that is distensible, said welding-part being indicated by 36 and comprising a plurality of walls, indicated by 36'. Each of said walls has an attenuated cross-section and is disposed in angular, edgewise relation to the plane of the sheathed surface 60 of the sheathed member 35. The numeral 45 indicates the plug, the plug-extension being indicated by 45', the sheathing by 40, the adjoining sheathing-portions by 40', the fillet-welds securing the welding-walls to the sheathed member by 37, the welding-opening by 61, the adjoining outer parts by 43, the welding-surfaces of the welding-walls by 41 and opposed surfaces thereof by 42. The sheathing is recessed at 44 in a manner whereby defining surfaces 62 are provided (adjacent to the sheathed member) whose greater part approach one another in the direction toward the sheathed member. The welding-walls are provided on their welding-surfaces with sharp-edged projections 38. The tapering surfaces of the plug-extension are indicated by 63 and the sheathed surface of the sheathed member by 60. Before assuming the form shown in Figure 8, the welding-part has the form of a truncated section of a hollow pyramid. With the aid of a suitable tool, the corners of the said truncated section are squeezed so that the opposed walls therein assume positions substantially parallel to one another, each intersection of adjoining said welding-walls having thereon an outwardly projecting part constituted from the squeezed-together adjoining welding-wall-ends. The said outwardly projecting parts, or ears, are indicated by 36''. The application of this form of fastening means embraces the following steps: The sheathing or planks are placed on the sheathed member and the welding-part together with the adjoining outer parts are disposed within the major opening. After the welding-part has been tack-welded to the sheathed member, the sheathing and the adjoining outer parts are then temporarily removed, after having served substantially as templates or laying-off mediums for the correct positioning of the welding-part, and the welding is completed, after which the sheathing and the adjoining outer parts together with the not entirely inserted plug are disposed until the various parts have the relative positions shown in Figure 9. The plug is then hammered in with a maul until the plug-extension enters the welding-opening, the tapering surfaces of the plug-extension serving to force the welding-walls with the adjoining outer parts outwardly until the latter have contacted with defining surfaces 62 and the plug-extension has been securely seized by the sharp-edged projections, this last described position being the one illustrated in Figure 10. It will be noted how the adjoining outer parts have partially entered the recesses 44 with the outer surfaces of said outer parts faying with defining surfaces 62, thereby obtaining a wedging effect by the general means on the adjoining sheathing-portions against the sheathed member. It is the forcible insertion of the plug-extension into the welding-opening that has caused an alteration of the angular relation of the welding-walls to the plane of the sheathed surface. Notwithstanding that the adjoining outer parts are not otherwise secured to the welding-part, it is obvious that the absence of appreciable play between the various parts prevents any movement of the adjoining outer parts relative to the welding-part or of the adjoining sheathing-portions relative to the adjoining outer parts, in view of the inwardly tapered positions of the welding-part and the adjoining outer parts in the direction toward the sheathed member when in final condition as illustrated in Figure 10. Although the welding-walls are shown in integral form, they may be separate from one another and yet be designed and function within the scope of my invention substantially as above described.

Obviously, my invention can be applied not only to the sheathing of steel plating but also to the sheathing of non-shell-plated or partially shell-plated structures. For example, speaking of ships, the "tank-top" may be constituted of wooden planks directly attached to the flanged parts of the framing on the bottom strakes, and the inner walls of double-walled ships may be built in the same manner. Also decks, especially decks about the "strength-deck." As a matter of fact, the entire shell-plating of a barge may be entirely supplanted by wooden planks directly secured to the "inner" flanges of the framing of the vessel by fastening means embodying my invention, in which case of course the framing would have to be heavier and a suitable amount of diagonal frames would have to be introduced to compensate for the fact that the wooden planks should not be required to assume tensional stresses in great amounts. On the other hand, the extra framing would be at least partially offset by the lower cost of attaching the planks to the frames compared with the cost of joining shell-plates. Also, wooden barges are not painted. Other applications are the decks of sand and gravel scows, the inner sides and inner bottoms of hopper-type coal barges, barge-fenders for the gunwales, chines and ends, wooden tanks with exterior steel framing for special instances where wood is preferred on account of the contents, and cargo-battens for the holds of ships and barges.

Having reference to the first two fastening means described in Figures 1 to 5, a supplemental anti-charring means can be incorporated by temporarily or permanently inserting asbestos or other heat-resistant material between the outer surface of the outer part and the defining surfaces.

Although the present invention is primarily an improvement on my "Wooden sheathing" invention, it is not limited by the latter, whose salient characteristic is the extreme shallowness of the fastening means. To be specific, I can envisage my invention applied to general means in which there are metal parts of a hardness little if at all exceeding that of the sheathing and extending to the exterior surface of the latter. In such applications, the said metal parts would abrade approximately simultaneously with the sheathing.

The use of protective coatings, lead-soaked pieces of canvas as stop-waters and other associated substances familiar to experienced personnel everywhere, is as natural with my invention as with other types of fastening means and applied for identical reasons and practically in like manner. Therefore when the constituent parts of my general means and neighboring parts, such as sheathing, sheathed members, plugs, et cetera, are separated from one another for such purely nominal distances by the above mentioned substances, such inconsequential separations are not to be regarded as effecting the scope of my invention, having particular regard for the use of the words "substantially adjoining" in this specification and the accompanying claims.

I claim—

1. The combination of a sheathed member, sheathing and general means securing said sheathing on said member and including a welding-part having therein at least one welding-opening substantially opening to said sheathed member, said welding-part being welded thereto within said welding-opening and being appreciably spaced from said sheathing.

2. The combination of a sheathed member having an imperforate surface, sheathing and general means securing said sheathing on said member and including a welding-part having therein at least one welding-opening substantially opening to said sheathed member, said welding-part being welded within said welding-opening to said imperforate member and being appreciably spaced from said sheathing.

3. The combination of a sheathed member, sheathing and general means securing said sheathing on said sheathed member and including a welding-part having therein at least one welding-opening substantially opening to said sheathed member, said welding-part being welded thereto within said welding-opening, said welding-part being appreciably spaced from said sheathing, said sheathing having therein a through major opening to said sheathed member and appreciably exceeding in size said general means.

4. The combination of a sheathed member, sheathing and general means securing said sheathing on said sheathed member and including a welding-part having therein at least one through welding-opening substantially opening to said sheathed member, said welding part being welded thereto within said welding-opening, said welding-part being appreciably spaced from said sheathing, the maximum dimension of said sheathing in the direction rectangular to the plane of the sheathing surface of said sheathed member appreciably exceeding the maximum dimension of said general means in like direction.

5. The combination of a sheathed member, sheathing thereon having a through major opening whose defining surfaces extend from the exterior surface of said sheathing to the sheathed surface of said sheathed member, general means securing said sheathing on to said sheathed member, said general means including a welding-part having a through welding-opening opening to said sheathed surface, said welding-opening being defined by a welding surface of said welding part at which said welding part is welded to said sheathed member, said welding-part being disposed within said major opening, said welding-part having an outer, opposed surface substantially opposed to said welding-surface, and an appreciable space obtaining between said opposed surface and said defining surfaces of said major opening.

6. The combination described in claim 5, but characterized by said space being adapted to receive heat-insulating means during the welding operation.

7. The combination described in claim 5, but characterized by said general means including an adjoining outer part, said welding-part and said outer part being respectively externally and internally threaded to permit screwing said outer part over said welding-part, said outer part being provided with specific means for securing said sheathing.

8. The combination described in claim 5, but characterized by said general means including an adjoining outer part, said welding-part and said outer part being cooperatively threaded to permit screwing them together, said outer part being provided with specific means for securing said sheathing.

9. The combination described in claim 5, but characterized by the marginal portions of said defining surfaces adjacent to said sheathed member having substantially the form of a truncated cone whose projected axis is directed toward said sheathed member, and by said general means including an adjoining outer part, said welding-part and said outer part being cooperatively threaded to permit screwing them together, the outer surfaces of said outer part having substantially the form of a truncated cone whose projected axis is directed toward said sheathed member, said outer surfaces of said outer part being adapted to bear against said marginal portions of said defining surfaces.

10. The method of securing an area of through-perforated sheathing to a metal area comprising the steps of laying the perforated sheathing on the metal area and maintaining the same through the remaining steps in the position in which the same is desired to be secured, inserting in each perforation the selected one of a pair of coacting fastening members, welding an end of said inserted member to the sheathed metal area as the same is positioned in said perforation by employing a welding heat liable to harmfully affect the sheathing, insulating the sheathing from the harmfulness of said heat during the welding by the utilization of an intervening space extending throughout at least a substantial portion of the length of the welded member, and finally securing the position-laid sheathing to the metal area by a coaction of said pair of fastening members to cause a securing effect in at least a portion of the perimeter of said perforation.

11. The method of securing an area of through-perforated sheathing to a metal area comprising the steps of laying the perforated sheathing on the metal area and maintaining the same through the remaining steps in the position in which the same is desired to be secured, inserting in each perforation the selected one of a pair of coacting fastening members, placing a heat-resisting material between said inserted member and the walls of the through-perforation in said sheathing to insulate the sheathing from the harmfulness of heat during the welding, welding an end of said inserted member to the sheathed metal area as the same is positioned in said perforation, and finally securing the position-laid sheathing to the metal area by a coaction of said pair of fastening members to cause a securing effect in at least a portion of the perimeter of said perforation.

12. The combination of a sheathed metallic member, sheathing thereon having at least one through opening, a metallic holding member weld-deposited in said opening at one of its ends to said metallic member, the relative perimeters of said through opening and of said holding member being such that the holding member is spaced from the wall of the through opening throughout at least the major portion of the length of the holding member to obviate charring of said spaced portion of said wall of said through opening during welding, and means coacting with said holding member and said spaced portion of said wall of said through opening for securing the sheathing to the sheathed member.

13. The combination of a sheathed metallic member, sheathing thereon having at least one through opening, a metallic holding member weld-deposited in said opening at one of its ends to said metallic member, the relative perimeters of said through opening and of said holding member being such that the holding member is spaced from the wall of the through opening throughout at least the major portion of the length of the holding member, heat-resisting means in said space effective to obviate charring of said spaced portion of said wall of said through opening during welding, and means coacting with said holding member and said spaced portion of said wall of said through opening for securing the sheathing to the sheathed member.

NICHOLAS RIPPEN.